(12) United States Patent
Wang et al.

(10) Patent No.: US 12,062,357 B2
(45) Date of Patent: Aug. 13, 2024

(54) METHOD OF REGISTERING ATTRIBUTE IN SPEECH SYNTHESIS MODEL, APPARATUS OF REGISTERING ATTRIBUTE IN SPEECH SYNTHESIS MODEL, ELECTRONIC DEVICE, AND MEDIUM

(71) Applicant: Beijing Baidu Netcom Science Technology Co., Ltd., Beijing (CN)

(72) Inventors: Wenfu Wang, Beijing (CN); Xilei Wang, Beijing (CN); Tao Sun, Beijing (CN); Han Yuan, Beijing (CN); Zhengkun Gao, Beijing (CN); Lei Jia, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 319 days.

(21) Appl. No.: 17/455,156

(22) Filed: Nov. 16, 2021

(65) Prior Publication Data

US 2022/0076657 A1    Mar. 10, 2022

(30) Foreign Application Priority Data

Nov. 17, 2020   (CN) .......................... 202011285796.1

(51) Int. Cl.
*G10L 13/02*    (2013.01)

(52) U.S. Cl.
CPC .................................. *G10L 13/02* (2013.01)

(58) Field of Classification Search
None
See application file for complete search history.

(56) References Cited

U.S. PATENT DOCUMENTS

| 10,706,837 | B1* | 7/2020 | Chicote | G10L 13/033 |
| 11,398,218 | B1* | 7/2022 | Haslam | G10L 13/00 |
| 2013/0289998 | A1* | 10/2013 | Eller | G10L 13/08 |
| | | | | 704/260 |

(Continued)

FOREIGN PATENT DOCUMENTS

| CN | 105261355 | 1/2016 |
| CN | 107705783 | 2/2018 |

(Continued)

OTHER PUBLICATIONS

First Korean Office Action, issued in the corresponding Korean patent application No. 10-2021-0117979, dated Sep. 14, 2022, 13 pages.

(Continued)

*Primary Examiner* — Stella L. Woo
(74) *Attorney, Agent, or Firm* — HSML P.C.

(57) ABSTRACT

A method of registering an attribute in a speech synthesis model, an apparatus of registering an attribute in a speech synthesis model, an electronic device, and a medium are provided, which relate to a field of an artificial intelligence technology such as a deep learning and intelligent speech technology. The method includes: acquiring a plurality of data associated with an attribute to be registered; and registering the attribute in the speech synthesis model by using the plurality of data associated with the attribute, wherein the speech synthesis model is trained in advance by using a training data in a training data set.

7 Claims, 9 Drawing Sheets

(56) References Cited

U.S. PATENT DOCUMENTS

| | | | | |
|---|---|---|---|---|
| 2020/0372897 A1* | 11/2020 | Battenberg | ............ | G06N 3/045 |
| 2021/0335381 A1* | 10/2021 | Park | ........................ | G10L 15/22 |
| 2023/0046658 A1* | 2/2023 | Bowers | ................ | G10L 13/033 |

FOREIGN PATENT DOCUMENTS

| | | |
|---|---|---|
| CN | 109523986 | 3/2019 |
| CN | 110599998 | 12/2019 |
| CN | 111276120 | 6/2020 |
| CN | 111508470 | 8/2020 |
| CN | 111667811 | 9/2020 |
| CN | 111883101 | 11/2020 |
| CN | 111899719 | 11/2020 |
| JP | 2020-076843 | 5/2020 |
| WO | 2020/050509 | 3/2020 |

OTHER PUBLICATIONS

First Japanese Office Action, issued in the corresponding Japanese patent application No. 2021-144165, dated Sep. 27, 2022, 8 pages.
Wang et al., "Style Tokens: Unsupervised Style Modeling, Control and Transfer in End-to-End Speech Synthesis", International Conference on Machine Learning, Stockholm, Sweden, PMLR 80, 2018, 10 pages, available at https://google.github.io/tacotron/publications/global_style_tokens/.
First Chinese Office Action, issued in the corresponding Chinese patent application No. 202011285796.1, dated Apr. 9, 2021, 22 pages.
Second Chinese Office Action issued in the corresponding Chinese patent application No. 202011285796.1, dated Jun. 17, 2021, 24 pages.

* cited by examiner

METHOD OF REGISTERING ATTRIBUTE IN SPEECH SYNTHESIS MODEL, APPARATUS OF REGISTERING ATTRIBUTE IN SPEECH SYNTHESIS MODEL, ELECTRONIC DEVICE, AND MEDIUM

CROSS-REFERENCE TO RELATED APPLICATION(S)

This application claims priority to the Chinese Patent Application No. 202011285796.1, filed on Nov. 17, 2020, which is incorporated herein by reference in its entirety.

TECHNICAL FIELD

The present disclosure relates to a field of a computer technology, in particular to a field of an artificial intelligence technology such as a deep learning and intelligent speech technology, and more specifically to a method of registering an attribute in a speech synthesis model, an apparatus of registering an attribute in a speech synthesis model, an electronic device, and a medium.

BACKGROUND

Speech synthesis is also known as Text-to-Speech (TTS) and refers to a process of converting text information into speech information with a good sound quality and a natural fluency through a computer. The speech synthesis technology is one of core technologies of an intelligent speech interaction technology.

In recent years, with a development of the deep learning technology and its wide application in the field of speech synthesis, the sound quality and natural fluency of the speech synthesis have been improved as never before. The current speech synthesis model is mainly used to realize the speech synthesis of a single speaker (that is, a single tone) and a single style. In order to realize multi-style and multi-tone synthesis, training data in various styles recorded by each speaker may be acquired to train the speech synthesis model.

SUMMARY

According to the present disclosure, a method of registering an attribute in a speech synthesis model, an apparatus of registering an attribute in a speech synthesis model, an electronic device, and a medium are provided.

According to an aspect of the present disclosure, there is provided a method of registering an attribute in a speech synthesis model, including:
  acquiring a plurality of data associated with an attribute to be registered; and
  registering the attribute in the speech synthesis model by using the plurality of data associated with the attribute, wherein the speech synthesis model is trained in advance by using a training data in a training data set.

According to another aspect of the present disclosure, there is provided an electronic device, including:
  at least one processor; and
  a memory communicatively connected to the at least one processor, wherein the memory stores instructions executable by the at least one processor, and the instructions, when executed by the at least one processor, cause the at least one processor to implement the method described above.

According to another aspect of the present disclosure, there is provided a non-transitory computer-readable storage medium having computer instructions stored thereon, and the computer instructions allow a computer to implement the method described above.

It should be understood that content described in this section is not intended to identify critical or important features in the embodiments of the present disclosure, nor is it intended to limit the scope of the present disclosure. Other features of the present disclosure will be easily understood through the following description.

BRIEF DESCRIPTION OF THE DRAWINGS

The drawings are used to better understand the solution and do not constitute a limitation to the present disclosure.

DETAILED DESCRIPTION OF EMBODIMENTS

The following describes exemplary embodiments of the present disclosure with reference to the accompanying drawings, which include various details of the embodiments of the present disclosure to facilitate understanding, and should be considered as merely exemplary. Therefore, those ordinary skilled in the art should realize that various changes and modifications can be made to the embodiments described herein without departing from the scope and spirit of the present disclosure. Likewise, for clarity and conciseness, descriptions of well-known functions and structures are omitted in the following description.

In recent years, with a wide use of a speech synthesis technology in various fields and a continuous enrichment of application scenarios, a diversity of a speech synthesis, such as a multi-style and multi-tone synthesis, has been increasingly sought after by users. However, existing speech synthesis models only support a synthesis of styles and tones in a training data set, and it is difficult to meet needs of many application scenarios. For example, in a case of using new styles and tones outside the training data set for speech broadcasting, especially in a case of a cross-style and cross-tone synthesis for ordinary users, ordinary users cannot use their own styles and tones for speech broadcasting.

Based on the above technical problems, according to the present disclosure, there is provided a method of registering a style and/or a tone by using a small amount of user data, so as to realize diversified and personalized customization of style and tone, which may meet personalized needs of users and is of great practical value. A basic idea of registering the style and/or the tone of the present disclosure is to use a small amount of user data, such as hundreds of data, to fine-tune a speech synthesis model pre-trained based on the training data set, so that the speech synthesis model may recognize the style and/or the tone to be registered, and then the speech synthesis model may perform the speech synthesis by using the registered style and/or tone, so as to meet the personalized needs of users. By registering the style and/or the tone in the speech synthesis model, the present disclosure can enrich diversity and interest of the speech synthesis of user scenarios, improve product closeness and personification, and improve user experience. The present disclosure may be applied to various personalized speech interaction scenarios, and has universal popularization.

Firstly, a solution of training a cross-language, cross-style and cross-tone speech synthesis model in this embodiment is introduced.

Figure 1:
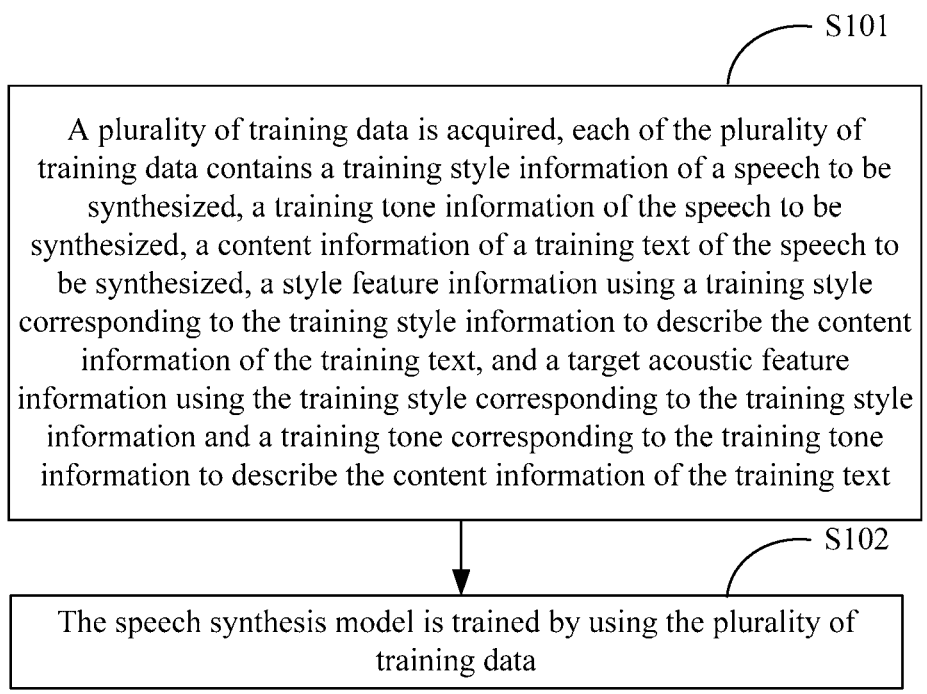
FIG. 1 shows a schematic diagram according to a first embodiment of the present disclosure.

FIG. 1 shows a schematic diagram according to a first embodiment of the present disclosure. As shown in FIG. 1, this embodiment provides a method of training a speech synthesis model, which may specifically include following steps.

In step S101, a training data set including a plurality of training data is acquired. Each of the plurality of training data contains a training style information of a speech to be synthesized, a training tone information of the speech to be synthesized, a content information of a training text of the speech to be synthesized, a style feature information using a training style corresponding to the training style information to describe the content information of the training text, and a target acoustic feature information using the training style corresponding to the training style information and a training tone corresponding to the training tone information to describe the content information of the training text.

In step S102, the speech synthesis model is trained by using the plurality of training data in the training data set.

An execution subject of the method of training the speech synthesis model in this embodiment is a device of training the speech synthesis model, which may be an electronic entity. Alternatively, the execution subject may also be an application integrated with software, which runs on a computer apparatus during use to train the speech synthesis model.

In the training in this embodiment, more than one million training data may be acquired to train the speech synthesis model more accurately. Each training data may contain the training style information of the speech to be synthesized, the training tone information of the speech to be synthesized, and the content information of the training text of the speech to be synthesized.

The training style information in this embodiment may be a style identifier, such as a style ID, or may be another format extracted from an audio information described in this style. However, in practical application, when used, the audio information described in this style may be expressed in the form of a Mel spectrum sequence. The training tone information in this embodiment may also be extracted based on an audio information described in this tone, and the training tone information may also be expressed in the form of a Mel spectrum sequence.

The training style information in this embodiment is used to define a style of a speech description, such as humor, joy, sadness, tradition, etc. The training tone information in this embodiment is used to define a tone of a sound for the speech description, which may be, for example, star A, announcer B, cartoon animal C, and so on.

The content information of the training text of this embodiment is in text form. The content information of the training text may be specifically a phoneme sequence of the training text. For example, if the training text is Chinese, the content information may be a phoneme sequence with tones of the training text. Since a pronunciation of Chinese characters carries tones, the phoneme sequence with tones for Chinese should be acquired. For other languages, the content information of the training text is the phoneme sequence of the training text. For example, when the training text is Chinese, the phoneme may be a syllable in Chinese Pinyin, such as an initial or a vowel.

In addition, each of the plurality of training data may contain the style feature information using the training style corresponding to the training style information to describe the content information of the training text, and the target acoustic feature information using the training style corresponding to the training style information and the training tone corresponding to the training tone information to describe the content information of the training text. The two information may be used as a reference for supervised training, so that the speech synthesis model may learn more effectively.

By adopting the above solution, the method of training the speech synthesis model in this embodiment may be implemented to effectively train the speech synthesis model, to enable the speech synthesis model to learn, based on the training data, a process of synthesizing a speech according to the content, the style and the tone, so that the speech synthesis model after learning may enrich the diversity of the speech synthesis.

Figure 2:
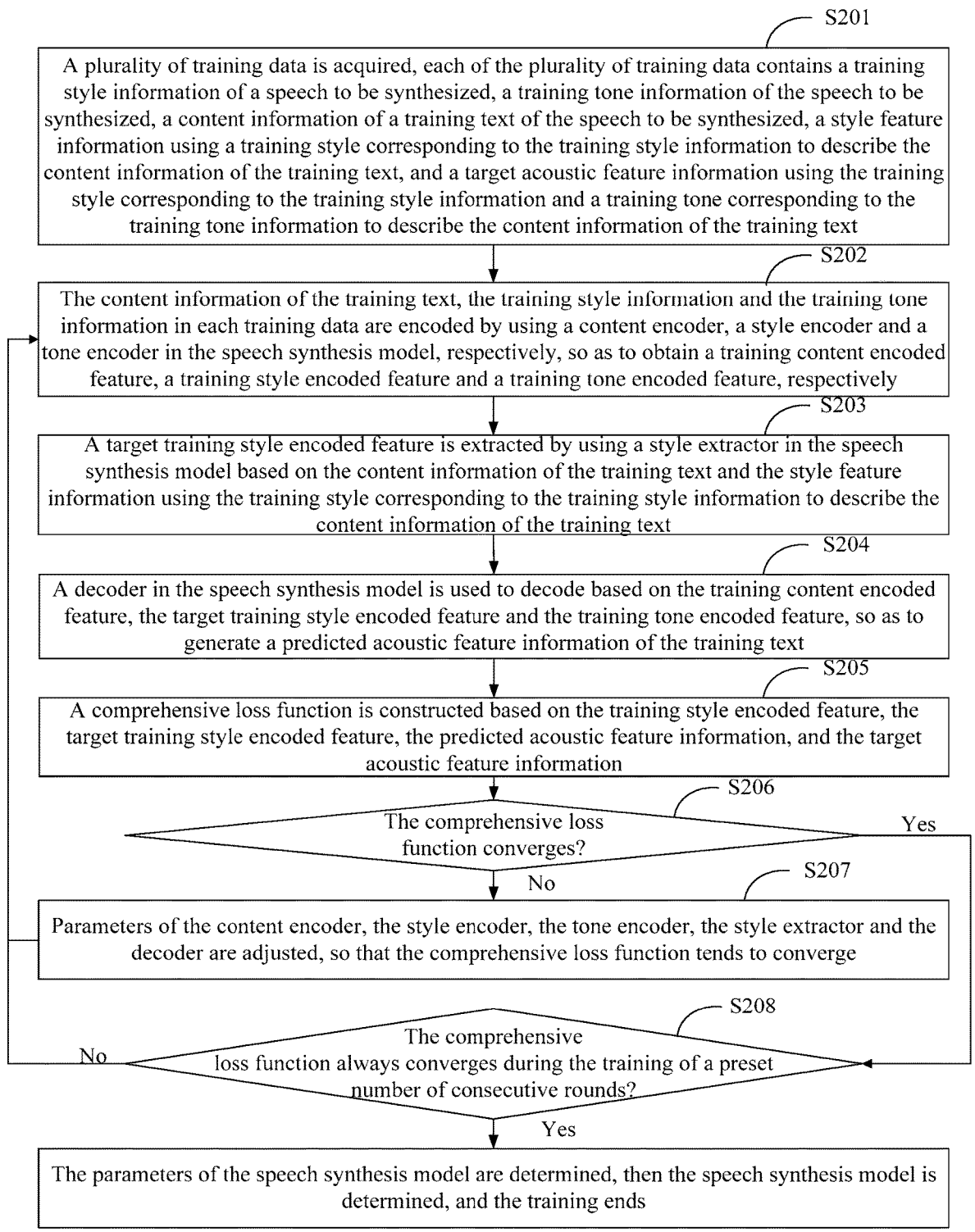
FIG. 2 shows a schematic diagram according to a second embodiment of the present disclosure.

FIG. 2 shows a schematic diagram according to a second embodiment of the present disclosure. The technical solution of the present disclosure is described in more detail in the embodiment of the method of training the speech synthesis model shown in FIG. 2 on the basis of the embodiment shown in FIG. 1. As shown in FIG. 2, the method of training the speech synthesis model of this embodiment may specifically include following steps.

In step S201, a plurality of training data is acquired. Each of the plurality of training data contains a training style information of a speech to be synthesized, a training tone information of the speech to be synthesized, a content information of a training text of the speech to be synthesized, a style feature information using a training style corresponding to the training style information to describe the content information of the training text, and a target acoustic feature information using the training style corresponding to the training style information and a training tone corresponding to the training tone information to describe the content information of the training text.

In step S202, the content information of the training text, the training style information and the training tone information in each training data are encoded by using a content encoder, a style encoder and a tone encoder in the speech synthesis model, respectively, so as to obtain a training content encoded feature, a training style encoded feature and a training tone encoded feature, respectively.

Specifically, the content information of the training text in the training data is encoded by using the content encoder in the speech synthesis model, so as to obtain the training content encoded feature. The training style information and the content information of the training text in the training data is encoded by using the style encoder in the speech synthesis model, so as to obtain the training style encoded feature. The training tone information in the training data is encoded by using the tone encoder in the speech synthesis model, so as to obtain the training tone encoded feature.

In the implementation process, the content information of the training text in the training data may be encoded by using the content encoder in the speech synthesis model, so as to obtain the training content encoded feature. Since the content information of a text to be processed is in the form of a phoneme sequence, the corresponding training content encoded feature may also in the form of a sequence, which may be called a training content encoded sequence. Each phoneme corresponds to an encoding vector. The content encoder may determine how each phoneme is pronounced. Specifically, the training style information and the content information of the training text in the training data may be encoded by using the style encoder in the speech synthesis model, so as to obtain the training style encoded feature. In other words, the content information of the training text is encoded by using the style encoder, and an encoding style is controlled by using the training style information, so as to generate a corresponding training style encoded matrix, which may also be called a training style encoded sequence. Each phoneme corresponds to an encoding vector. The style encoder may determine a pronunciation mode of each phoneme, that is, a style. The training tone information may be encoded by using the tone encoder in the speech synthesis model, so as to obtain the training tone encoded feature. Since the Mel spectrum sequence may also be used for the training tone information, the tone encoder may also be used to encode the Mel spectrum sequence and generate corresponding tone vectors. The tone encoder may determine the tone of the speech to be synthesized, such as tone A, tone B, tone C, or the like.

In step S203, a target training style encoded feature is extracted by using a style extractor in the speech synthesis model based on the content information of the training text and the style feature information using the training style corresponding to the training style information to describe the content information of the training text.

It should be noted that the content information of the training text is the same as the content information of the training text input in the training of the style encoder. The style feature information using the training style corresponding to the training style information to describe the content information of the training text may be in the form of a Mel spectrum sequence.

Figure 3:
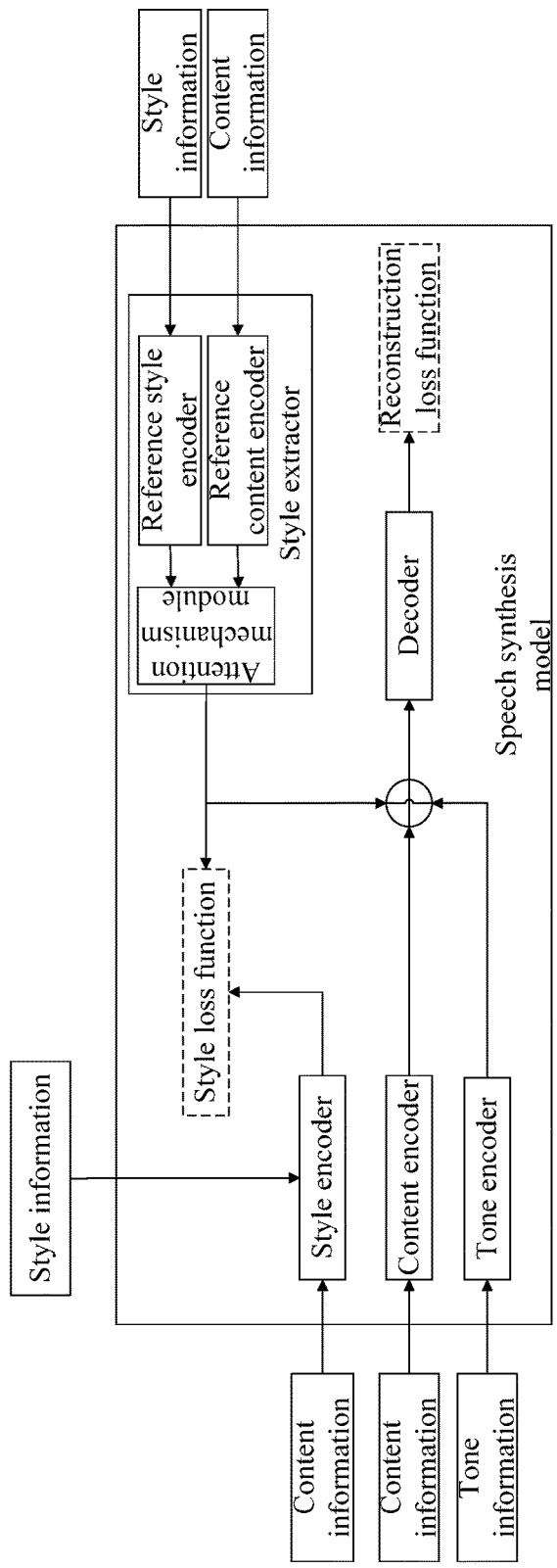
FIG. 3 shows a schematic diagram of a training architecture of a speech synthesis model of an embodiment.
Figure 4:
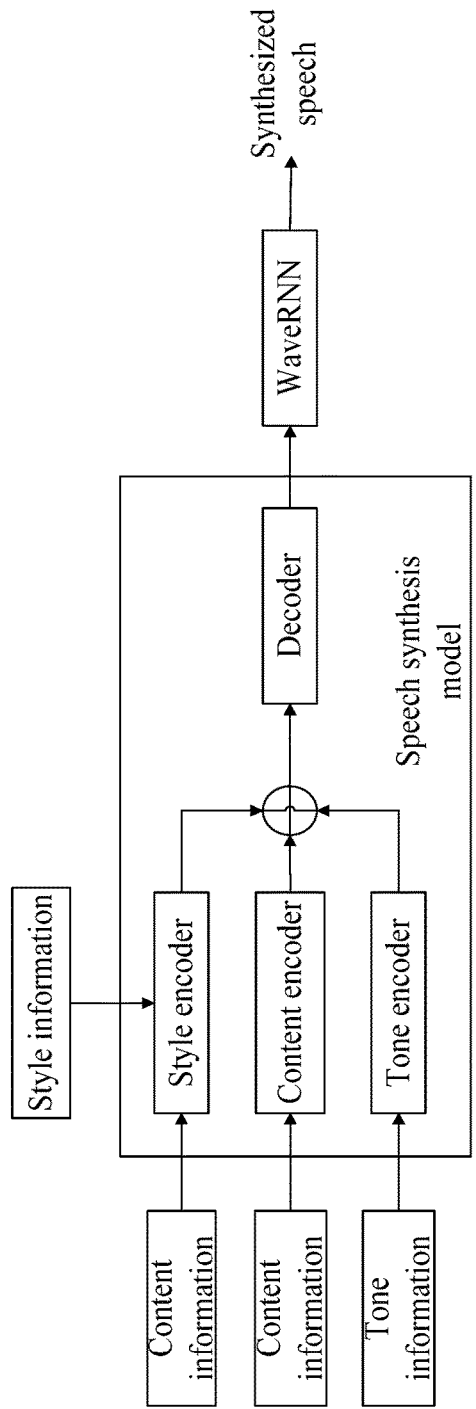
FIG. 4 shows a schematic diagram of an application architecture of a speech synthesis model of an embodiment.

FIG. 3 shows a schematic diagram of a training architecture of a speech synthesis model of an embodiment. FIG. 4 shows a schematic diagram of an application architecture of a speech synthesis model of an embodiment. As shown in FIG. 4, the speech synthesis model of this embodiment may include a content encoder, a style encoder, a tone encoder, and a decoder. Compared with a traditional speech synthesis model Tacotron, in the speech synthesis model shown in FIG. 4, the content encoder, the style encoder and the tone encoder are three separate units that play different roles in a decoupled state and undertake corresponding functions. This is a key to realize a cross-style, cross-tone and cross-language synthesis. Therefore, this embodiment is not limited to a speech synthesis of a single tone or a single style, and a cross-language, cross-style and cross-tone speech synthesis may be performed. For example, it is possible to achieve an English segment X broadcast in a humorous style by singer A, or a Chinese segment Y broadcast in a sad style by cartoon animal C, and so on.

As shown in FIG. 3, compared with the schematic diagram of the application architecture of the speech synthesis model shown in FIG. 4, a style extractor is added to the speech synthesis model during the training, so as to enhance a training effect. However, when the speech synthesis model is used, the style extractor is not required, and the architecture shown in FIG. 4 is directly adopted. As shown in FIG. 3, the style extractor may include a reference style encoder, a reference content encoder and an attention mechanism module, so as to compress a style vector to a text level, and the obtained target training style encoded feature is a learning target of the style encoder.

Figure 5:
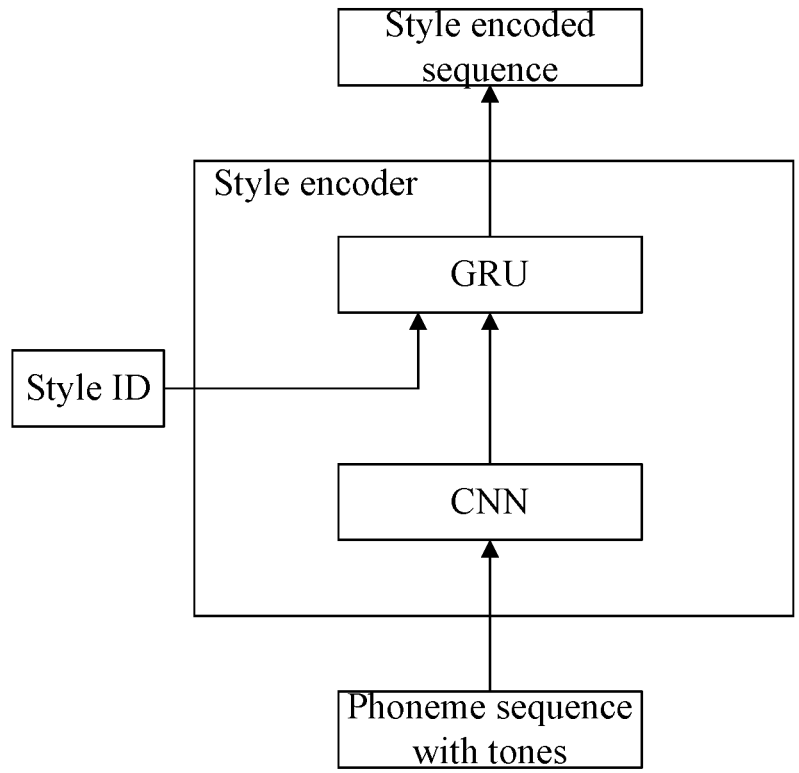
FIG. 5 shows a schematic diagram of a style encoder in a speech synthesis model of an embodiment.

The content encoder may include multiple layers of Convolutional Neural Network (CNN) with residual connections and a layer of bidirectional Long Short-Term Memory network (LSTM). The tone encoder may include multiple layers of CNN and a layer of Gated Recurrent Unit (GRU). The decoder is an autoregressive structure based on attention mechanism. The style encoder may include multiple layers of CNN and multiple layers of bidirectional GRU. For example, FIG. 5 shows a schematic diagram of the style encoder in the speech synthesis model of the embodiment. As shown in FIG. 5, a style encoder including N layers of CNN and N layers of GRU is illustrated by way of example. During the encoding of the style encoder, the content information of the text to be processed (for example, a phoneme sequence with tones if the text to be processed is Chinese) may be input directly into the CNN, and the style information (such as the style ID) may be input directly into the GRU. After the encoding of the style encoder, the style encoded feature may be finally output, which may also be called a style encoded sequence which is corresponding to the input phoneme sequence with tones.

Specifically, in a training stage, the style extractor may learn a style representation in an unsupervised manner, and the style representation may also act as a target of the style encoder to drive the style encoder to learn. Once the speech synthesis model is trained, the style encoder may have the same function as the style extractor. In an application stage, the style encoder may replace the style extractor. Therefore, the style extractor only exists in the training stage. It should be noted that due to a powerful role of the style extractor, the whole speech synthesis model may have good decoupling performance, that is, the content encoder, the style encoder and the tone encoder perform their respective duties and have a clear division of labor. The content encoder is responsible for how to pronounce, the style encoder is responsible for the style of pronunciation, and the tone encoder is responsible for the tone of pronunciation.

In step S204, a decoder in the speech synthesis model is used to decode based on the training content encoded feature, the target training style encoded feature and the training tone encoded feature, so as to generate a predicted acoustic feature information of the training text.

In step S205, a comprehensive loss function is constructed based on the training style encoded feature, the target training style encoded feature, the predicted acoustic feature information, and the target acoustic feature information.

For example, in the specific implementation, the step S205 may include step (a1) to step (c1).

In step (a1), a style loss function is constructed based on the training style encoded feature and the target training style encoded feature.

In step (b1), an acoustic feature loss function is constructed based on the predicted acoustic feature information and the target acoustic feature information.

In step (c1), a comprehensive loss function is generated based on the style loss function and the reconstruction loss function.

Specifically, a weight may be configured for each of the style loss function and the reconstruction loss function, and a sum of the two weights may be determined as the final comprehensive loss function. A specific proportion of the weight may be set according to practical needs. For example, a large weight may be set to highlight the style. For example, when the weight for the reconstruction loss function is set to 1, the weight for the style loss function may be set to a value between 1 and 10. The greater the value, the greater the proportion of the style loss function, and the greater the impact of the style on the whole in training.

In step S206, it is determined whether the comprehensive loss function converges or not. If it is determined that the comprehensive loss function does not converge, step S207 is performed. If it is determined that the comprehensive loss function converges, step S208 is performed.

In step S207, parameters of the content encoder, the style encoder, the tone encoder, the style extractor and the decoder are adjusted, so that the comprehensive loss function tends to converge. Then, step S202 is performed to acquire a next training data and continue training.

In step S208, it is determined whether the comprehensive loss function always converges or not during the training of a preset number of consecutive rounds. If not, step S202 is performed to acquire a next training data and continue training. Otherwise, if it is determined that the comprehensive loss function always converges, the parameters of the speech synthesis model are determined, then the speech synthesis model is determined, and the training ends.

This step may be used as a training termination condition, in which the preset number of consecutive rounds may be set according to actual experience, such as 100 consecutive rounds, 200 consecutive rounds or other numbers. If the comprehensive loss function always converges in the training of the preset number of consecutive rounds, it shows that the speech synthesis model has been trained perfectly and the training may end. In addition, optionally, in actual training, the speech synthesis model may be in a process of converging infinitely, but does not converge absolutely in the training of preset number of consecutive rounds. In this case, the training termination condition may also be set as a preset threshold of rounds of training. When the number of rounds of training reaches the preset threshold of rounds, the training may be terminated, and the parameters of the speech synthesis model at the end of training are acquired as the final parameters of the speech synthesis model. Then, the speech synthesis model may be used based on the final parameters. Otherwise, the process proceeds for training until the number of rounds of training reaches the preset threshold of rounds.

The step S202 to step S207 described above are an implementation of the step S102 of the embodiment shown in FIG. 1.

Although each unit in the speech synthesis model is introduced in the training process of this embodiment, the training process of the whole speech synthesis model is end-to-end training. The training of the speech synthesis model may include two parts of loss functions. One is the reconstruction loss function constructed based on the output of the decoder, and the other is the style loss function constructed based on the output of the style encoder and the output of the style extractor. A loss function of L2 norm may be used for both loss functions.

By adopting the above solution, the method of training the speech synthesis model of this embodiment may be implemented to effectively ensure a complete decoupling of the content, the style and the tone in the training process, so that the trained speech synthesis model may perform a cross-style, cross-tone and cross-language speech synthesis, which may enrich the diversity of speech synthesis, reduce the boredom of long-time broadcasting, and improve the user experience.

The above is a principle of training the speech synthesis model by using the training data in the training data set. The trained speech synthesis model described above may only perform a cross-style, cross-tone and cross-language speech synthesis on the basis of the tones, the styles and the languages in the training set. Further, in order to use new styles and tones outside the training data set for speech broadcasting, especially in a case of a cross-style and cross-tone synthesis for ordinary users, a desired tone and/or a desired style should further be registered in the speech synthesis model in order to enable ordinary users to use their own styles and tones for speech broadcasting.

Figure 6:
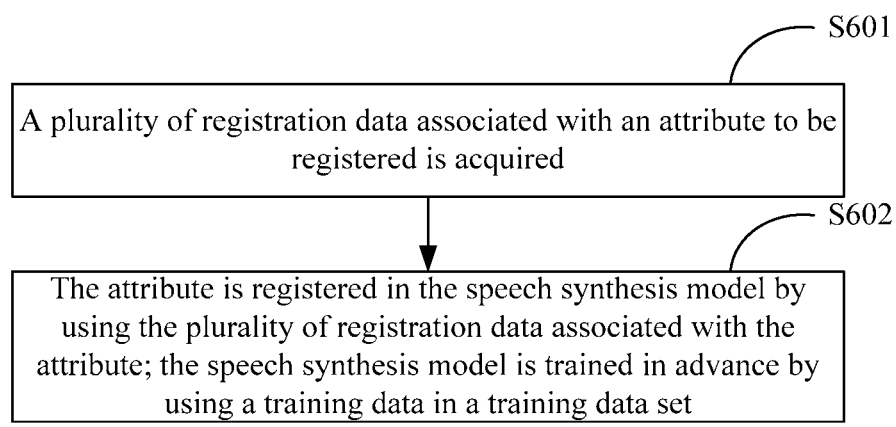
FIG. 6 shows a schematic diagram according to a third embodiment of the present disclosure.

FIG. 6 shows a schematic diagram according to a third embodiment of the present disclosure. As shown in FIG. 6, this embodiment provides a method of registering an attribute in a speech synthesis model, which may specifically include following steps.

In step S601, a plurality of registration data associated with an attribute to be registered is acquired.

In step S602, the attribute is registered in the speech synthesis model by using the plurality of registration data associated with the attribute. The speech synthesis model is trained in advance by using a training data in a training data set.

An execution subject of the method of registering the attribute in the speech synthesis model in this embodiment is an apparatus of registering an attribute in a speech synthesis model, which may be an electronic entity, or may be an entity integrated with applications for registering the attribute in the speech synthesis model.

The registering the attribute in the embodiment may include registering a tone and/or registering a style. The process of registering the attribute in this embodiment is similar to the training process, and it is a process of using the plurality of data associated with the attribute to fine-tune the speech synthesis model pre-trained by the training data in the training data set, so as to register the corresponding attribute such as the tone and/or the style in the speech synthesis model. Then, the speech synthesis model may be used to perform a speech synthesis by using the registered tone and/or style.

A requirement for the amount of data associated with the attribute to be registered in the process of registering the attribute in this embodiment is different from that for the data amount of the training data in the training data set in the speech synthesis model. For example, to train the speech synthesis model well, the amount of training data in the training data set should reach the order of millions or even more. However, experimental results show that when the tone attribute and/or the style attribute are/is registered in the speech synthesis model, only a small amount of registration data associated with the attribute should be acquired. For example, in some scenarios, a registration may be achieved with only ten sentences of registration data.

In the method of registering the attribute in the speech synthesis model in this embodiment, a plurality of registration data associated with the attribute to be registered is acquired, and the attribute is registered in the speech synthesis model by using the plurality of registration data associated with the attribute. The speech synthesis model is pre-trained by using a training data in a training data set. In this way, it is possible to register the attribute in the speech synthesis model, and enable the speech synthesis model to perform the speech synthesis based on the registered attribute, so as to meet personalized needs of users. Furthermore, the diversity and the interest of the speech synthesis of user scenarios may be enriched, the product closeness and personification may be improved, and the user experience may be improved. Moreover, the technical solution in this embodiment may be applied to various personalized speech interaction scenarios, and may have a universal popularization.

Figure 7:
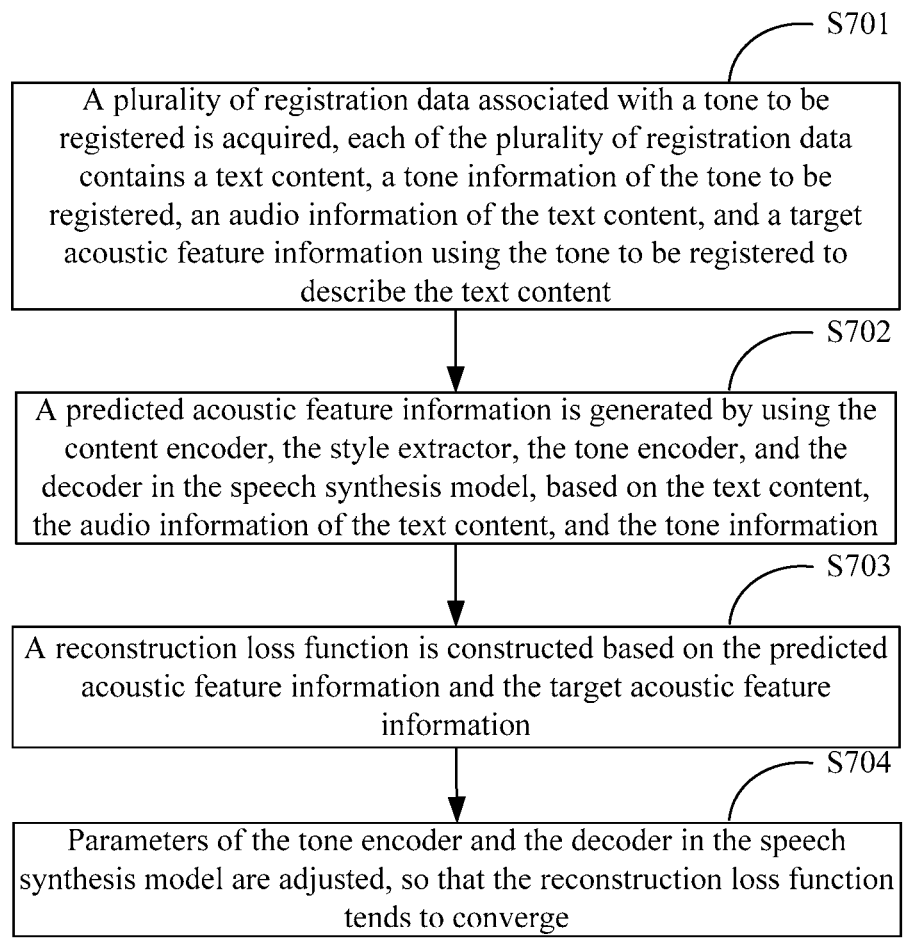
FIG. 7 shows a schematic diagram according to a fourth embodiment of the present disclosure.

FIG. 7 shows a schematic diagram according to a fourth embodiment of the present disclosure. The technical solution of the present disclosure is described in more detail in the embodiment of the method of registering the attribute in the speech synthesis model shown in FIG. 7 on the basis of the embodiment shown in FIG. 6. Registering a tone in the speech synthesis model is illustrated by way of example in describing the embodiment of FIG. 7. As shown in FIG. 7, the method of registering the attribute in the speech synthesis model in the embodiment may specifically include following steps.

In step S701, a plurality of registration data associated with a tone to be registered is acquired, each of the plurality of registration data contains a text content, a tone information of the tone to be registered, an audio information of the text content, and a target acoustic feature information using the tone to be registered to describe the text content.

Specifically, in this embodiment, the plurality of registration data are used to register the same tone, so the plurality of registration data contain the same tone information of the tone to be registered. In addition, the tone registration of the embodiment may be described with reference to the training architecture of the speech synthesis model shown in FIG. 3. As shown in FIG. 3, the style is not considered when the tone is registered, so the input information related to the style encoder is not considered when the data is acquired. Therefore, each registration data acquired in this embodiment may contain the tone information of the tone to be registered. For example, the tone information of the tone to be registered may be a corresponding Mel spectrum sequence extracted from a sentence of speech from a user to register the tone. Specifically, the sentence of speech may be a description of text content or other content from the user to register the tone. The tone information of the tone to be registered is used as an input of the tone encoder.

In addition, in order to ensure a normal operation of the speech synthesis model, the input information of the style extractor and the input information of the content encoder should further be considered. The input of the content encoder is the text content. The input of the style extractor is the text content and an audio information of the text content. The style information is not considered here. Specifically, the audio information of the text content may also be in the form of a Mel spectrum sequence.

The target acoustic feature information in the registration data using the tone to be registered to describe the text content may be a Mel spectrum sequence extracted from an audio of the text content described with the tone, so as to realize a supervised training.

The step S701 is an implementation of the step S601 in the embodiment shown in FIG. 6.

In step S702, a predicted acoustic feature information is generated by using the content encoder, the style extractor, the tone encoder, and the decoder in the speech synthesis model, based on the text content, the audio information of the text content, and the tone information.

For example, referring to the training structure shown in FIG. 3, the input text content is encoded by the content encoder so as to obtain the content encoded feature. The input tone information is encoded by the tone encoder so as to obtain the tone encoded feature. The target style encoded feature is extracted by the style extractor based on the input text content and the audio information of the text content. Although called the target style encoded feature here, this feature has nothing to do with the style at this time, but is named with reference to the feature extracted by the style extractor. The decoder may decode based on a comprehensive feature obtained by stitching the content encoded feature obtained by the content encoder, the tone encoded feature obtained by the tone encoder and the target style encoded feature extracted by the style extractor, so as to obtain a predicted acoustic feature information. Similarly, the predicted acoustic feature information may also be in the form of a Mel spectrum sequence, that is, a Mel spectrum sequence extracted from a predicted audio using the tone to describe the text content.

In step S703, a reconstruction loss function is constructed based on the predicted acoustic feature information and the target acoustic feature information.

In step S704, parameters of the tone encoder and the decoder in the speech synthesis model are adjusted, so that the reconstruction loss function tends to converge.

Optionally, prior to the step S704, it may be determined whether the reconstruction loss function converges or not. If it is determined that the reconstruction loss function does not converge, step S704 is performed. In addition, since a small amount of registration data, for example, hundreds or even less registration data are acquired, the small amount of registration data may theoretically not cause the model to converge quickly when the speech synthesis model is adjusted. Considering that the tone is registered in the speech synthesis model pre-trained with the training data set, and the speech synthesis model is only fine-tuned in the registration process, so it is possible not to determine whether the loss function converges or not. Instead, the parameters of the tone encoder and the decoder in the speech synthesis model may be adjusted directly, as long as the reconstruction loss function tends to converge.

The step S702 to step S704 are an implementation of the step S602 in the embodiment shown in FIG. 6.

In the mode of this embodiment, only user tone is registered, that is, only the user tone is required, and the style is not considered. A typical application scenario may be that the user speaks in imitation of a person in the training data set. Generally, the styles of persons in the training data set, such as a story style, a news style, an emotional style and so on, are very different. If the user desires broadcasting in many styles, it is only required to register the user tone to realize a "single-person and multi-style" synthesis, in which the user may speak in imitation with any style in the training data set.

By adopting the above solution, the method of registering the attribute in the speech synthesis model in this embodiment may be implemented to register the tone in the speech synthesis model, and enable the speech synthesis model to perform the speech synthesis based on the registered tone, so as to meet personalized needs of users. Furthermore, the diversity and the interest of the speech synthesis of user scenarios may be enriched, product closeness and personification may be improved, and user experience may be improved.

Figure 8:
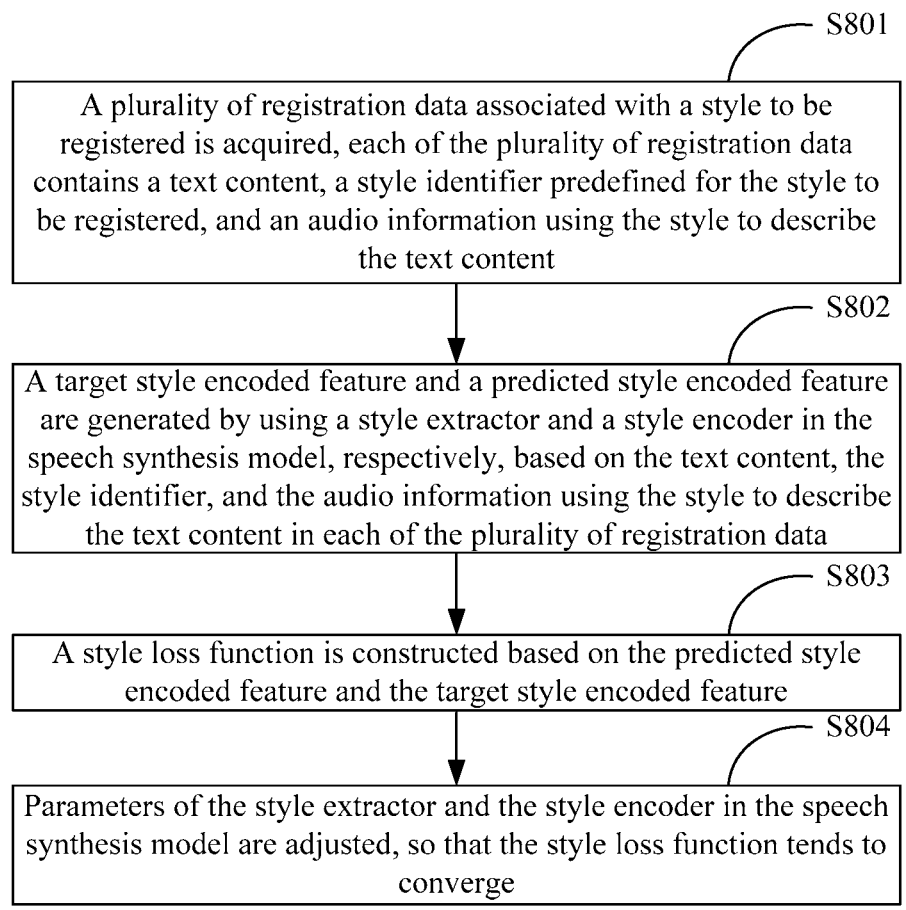
FIG. 8 shows a schematic diagram according to a fifth embodiment of the present disclosure.

FIG. 8 shows a schematic diagram according to a fifth embodiment of the present disclosure. The technical solution of the present disclosure is described in more detail in the embodiment of the method of registering the attribute in the speech synthesis model shown in FIG. 8 on the basis of the embodiment shown in FIG. 6. Registering a style in the speech synthesis model is illustrated by way of example in describing the embodiment of FIG. 8. As shown in FIG. 8, the method of registering the attribute in the speech synthesis model in the embodiment may specifically include following steps.

In step S801, a plurality of registration data associated with a style to be registered is acquired, each of the plurality of registration data contains a text content, a style identifier predefined for the style to be registered, and an audio information using the style to describe the text content.

Specifically, in this embodiment, the plurality of registration data are used to register the same style, so the plurality of registration data contain the same style identifier predefined for the style to be registered. In addition, the style registration of the embodiment may be described with reference to the training architecture of the speech synthesis model shown in FIG. 3. As shown in FIG. 3, the tone is not considered when the style is registered, so the input information related to the tone encoder is not considered when the data is acquired. Therefore, each registration data acquired in this embodiment may contain the text content, the style identifier predefined for the style to be registered, and the audio information using the style to describe the text content. For example, the audio information using the style to describe the text content may be a corresponding Mel spectrum sequence extracted from the speech using the style to be registered to describe the text content, which is used as the input of the style extractor along with the text content.

The step S801 is an implementation of the step S601 in the embodiment shown in FIG. 6.

In step S802, a target style encoded feature and a predicted style encoded feature are generated by using a style extractor and a style encoder in the speech synthesis model, respectively, based on the text content, the style identifier, and the audio information using the style to describe the text content in each of the plurality of registration data.

For example, referring to the training structure shown in FIG. 3, the style encoder may encode based on the input text content and style identifier, so as to obtain the predicted style encoded feature. The target style encoded feature may be extracted by the style extractor based on the input text content and the audio information using the style to describe the text content.

In step S803, a style loss function is constructed based on the predicted style encoded feature and the target style encoded feature.

In step S804, parameters of the style extractor and the style encoder in the speech synthesis model are adjusted, so that the style loss function tends to converge.

Optionally, prior to the step S804, it may be determined whether the style loss function converges or not. If it is determined that the style loss function does not converge, step S804 is performed. In addition, since a small amount of registration data, for example, hundreds or even less registration data are acquired, the small amount of registration data may theoretically not cause the model to converge quickly when the speech synthesis model is adjusted. Considering that the style is registered in the speech synthesis model pre-trained with the training data set, and the speech synthesis model is only fine-tuned in the registration process, so it is possible not to determine whether the style loss function converges or not. Instead, the parameters of the style extractor and the style encoder in the speech synthesis model may be adjusted directly, as long as the style loss function tends to converge. However, it should be noted that, similar to the training and the use of the speech synthesis model, in the use of the speech synthesis model, only the style encoder is used and the style extractor is not used.

The step S802 to step S804 are an implementation of the step S602 in the embodiment shown in FIG. 6.

In the mode of this embodiment, only user style is registered, that is, only the user style is required, and the tone is not considered. A typical application scenario may be that persons in the training data set speak in imitation of the user. Generally, persons in the training data set have many tones. For example, each speaker may have a tone, which may be clear, deep, sweet, or mature. If the user desires broadcasting with these tones in the user style, it is only required to register the user style to realize a "multi-person and single-style" synthesis, in which the persons in the training data set may speak in imitation with the user style.

By adopting the above solution, the method of registering the attribute in the speech synthesis model in this embodiment may be implemented to register the style in the speech synthesis model, and enable the speech synthesis model to perform the speech synthesis based on the registered style, so as to meet personalized needs of users. Furthermore, the diversity and the interest of the speech synthesis of user scenarios may be enriched, product closeness and personification may be improved, and user experience may be improved.

Figure 9:
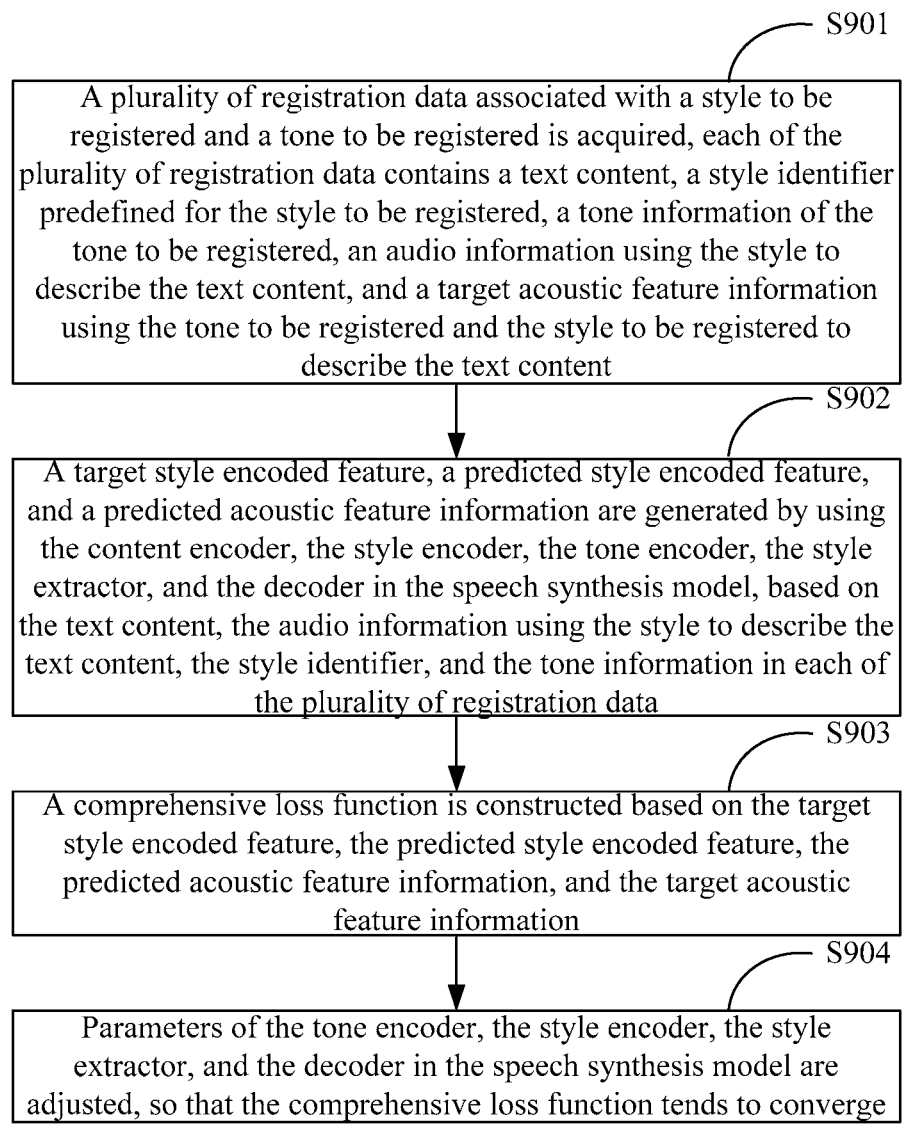
FIG. 9 shows a schematic diagram according to a sixth embodiment of the present disclosure.

FIG. 9 shows a schematic diagram according to a sixth embodiment of the present disclosure. The technical solution of the present disclosure is described in more detail in the embodiment of the method of registering the attribute in the speech synthesis model shown in FIG. 9 on the basis of the embodiment shown in FIG. 6. Registering both the style and the tone in the speech synthesis model is illustrated by way of example in describing the embodiment of FIG. 9. As shown in FIG. 9, the method of registering the attribute in the speech synthesis model in the embodiment may specifically include following steps.

In step S901, a plurality of registration data associated with a style to be registered and a tone to be registered is acquired, each of the plurality of registration data contains a text content, a style identifier predefined for the style to be registered, a tone information of the tone to be registered, an audio information using the style to describe the text content, and a target acoustic feature information using the tone to be registered and the style to be registered to describe the text content.

Specifically, in this embodiment, the tone and the style are simultaneously registered. For the explanation of the parameters, reference may be made to the explanation of the relevant parameters in the embodiments shown in FIG. 7 and FIG. 8. The embodiments shown in FIG. 7 and FIG. 8 may be combined to realize simultaneous registration of the tone and the style. Alternatively, a principle of the process of simultaneously registering the tone and the style is the same as that of the process of training the model described in the embodiment shown in FIG. 2. Reference may be made to the embodiment shown in FIG. 2 for details.

In step S902, a target style encoded feature, a predicted style encoded feature, and a predicted acoustic feature information are generated by using the content encoder, the style encoder, the tone encoder, the style extractor, and the decoder in the speech synthesis model, based on the text content, the audio information using the style to describe the text content, the style identifier, and the tone information in each of the plurality of registration data.

Optionally, the target style encoded feature is extracted by the style extractor, the predicted style encoded feature is obtained by encoding of the style encoder, and the predicted acoustic feature information is obtained by decoding of the decoder. The specific implementation process of this step may also refer to the relevant description of the embodiments shown in FIG. 7 and FIG. 8, which will not be repeated here.

In step S903, a comprehensive loss function is constructed based on the target style encoded feature, the predicted style encoded feature, the predicted acoustic feature information, and the target acoustic feature information.

For example, the specific implementation of this step may refer to the construction process of the comprehensive loss function in step S205 in the embodiment shown in FIG. 2, which will not be repeated here.

In step S904, parameters of the tone encoder, the style encoder, the style extractor, and the decoder in the speech synthesis model are adjusted, so that the comprehensive loss function tends to converge.

Optionally, prior to the step S904, it may be determined whether the style loss function converges or not. If it is determined that the style loss function does not converge, step S904 is performed. In addition, since a small amount of registration data, for example, hundreds or even less registration data are acquired, the small amount of registration data may theoretically not cause the model to converge quickly when the speech synthesis model is adjusted. Considering that the style and the tone are registered in the speech synthesis model pre-trained with the training data set, and the speech synthesis model is only fine-tuned in the registration process, so it is possible not to determine whether the comprehensive loss function converges or not. Instead, the parameters of the tone encoder, the style encoder, and style extractor and the decoder in the speech synthesis model may be adjusted directly, as long as the comprehensive loss function tends to converge. Similar to the training and the use of the speech synthesis model, in the use of the speech synthesis model, only the style encoder is used and the style extractor is not used.

The step S902 to step S904 are an implementation of the step S602 in the embodiment shown in FIG. 6.

In the mode of the embodiment, the user tone and the user style may be registered simultaneously. A typical application is that the user may speak in imitation with the person in the training data set, and the person in the training data set may speak in imitation with the user, and further, the broadcasting in the user's own tone and style is supported. This mode is a combination and generalization of the tone registration mode shown in FIG. 7 and the style registration mode shown in FIG. 8. In this mode, the "single-person and multi-style" synthesis and the "multi-person and single-style" synthesis may be performed simultaneously, that is, a mutual imitation of the user and the person in the training data set may be achieved.

By adopting the above solution, the method of registering the attribute in the speech synthesis model of the embodiment may be implemented to register the tone and the style in the speech synthesis model, and enable the speech synthesis model to perform the speech synthesis based on the registered tone and the registered style, so as to meet personalized needs of users. Furthermore, the diversity and the interest of the speech synthesis of user scenarios may be enriched, product closeness and personification may be improved, and user experience may be improved.

Figure 10:
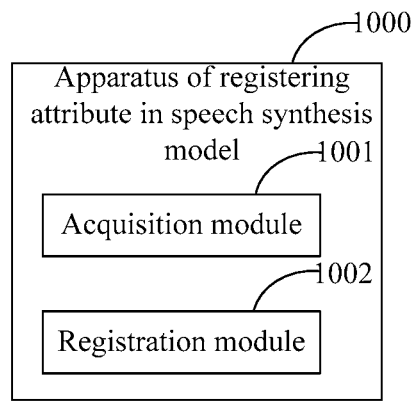
FIG. 10 shows a schematic diagram according to a seventh embodiment of the present disclosure.

FIG. 10 shows a schematic diagram according to a seventh embodiment of the present disclosure. As shown in FIG. 10, according to this embodiment, there is provided an apparatus 1000 of registering an attribute in a speech synthesis model, which may specifically include: an acquisition module 1001 and a registration module 1002. The acquisition module 1001 is used to acquire a plurality of data associated with an attribute to be registered. The registration module 1002 is used to register the attribute in the speech synthesis model by using the plurality of data associated with the attribute. The speech synthesis model is trained in advance by using a training data in a training data set.

The implementation principle and technical effect of the apparatus 1000 of registering the attribute in the speech synthesis model by using the modules described above in this embodiment are the same as those in the related method embodiments, which will not be repeated here.

Figure 11:
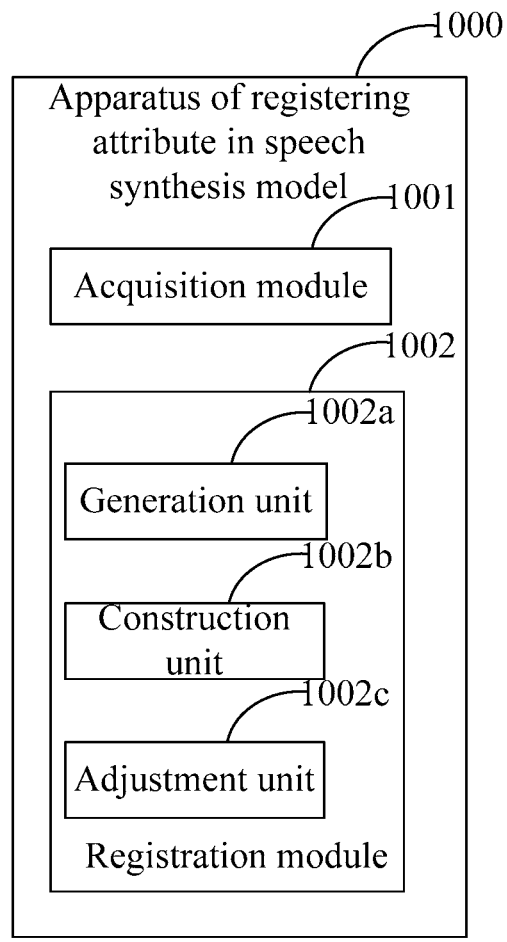
FIG. 11 shows a schematic diagram according to an eighth embodiment of the present disclosure.

FIG. 11 shows a schematic diagram according to a seventh embodiment of the present disclosure. The technical solution of the present disclosure is described in more detail in the embodiment of the apparatus 1000 of registering the attribute in the speech synthesis model shown in FIG. 11 on the basis of the embodiment shown in FIG. 10.

In the apparatus 1000 of registering the attribute in the speech synthesis model in this embodiment, the acquisition module 1001 may be used to: acquire, in response to the attribute containing a tone, a plurality of registration data associated with a tone to be registered. Each of the plurality of registration data contains a text content, a tone information of the tone to be registered, an audio information of the text content, and a target acoustic feature information using the tone to be registered to describe the text content.

Further optionally, as shown in FIG. 11, in the apparatus 1000 of registering the attribute in the speech synthesis model in this embodiment, the registration module 1002 may include: a generation unit 1002a, a construction unit 1002b and an adjustment unit 1002c. The generation unit 1002a is used to generate a predicted acoustic feature information by using a content encoder, a style extractor, a tone encoder, and a decoder in the speech synthesis model, based on the text content, the audio information of the text content, and the tone information in each of the plurality of registration data. The construction unit 1002b is used to construct a reconstruction loss function based on the predicted acoustic feature information and the target acoustic feature information. The adjustment unit 1002c is used to adjust parameters of the tone encoder and the decoder in the speech synthesis model, so that the reconstruction loss function tends to converge.

Further optionally, the acquisition module 1001 may be further used to: acquire, in response to the attribute containing a style, a plurality of registration data associated with a style to be registered, and each of the plurality of registration data contains a text content, a style identifier predefined for the style to be registered, and an audio information using the style to describe the text content.

Accordingly, the generation unit 1002a may be further used to generate a target style encoded feature and a predicted style encoded feature by using a style extractor and a style encoder in the speech synthesis model, respectively, based on the text content, the style identifier, and the audio information using the style to describe the text content in each of the plurality of registration data. The construction unit 1002*b* may be further used to construct a style loss function based on the target style encoded feature and the predicted style encoded feature. The adjustment unit 1002*c* may be further used to adjust parameters of the style extractor and the style encoder in the speech synthesis model, so that the style loss function tends to converge.

Further optionally, the acquisition module 1001 may be further used to: acquire a plurality of registration data associated with a style to be registered and a tone to be registered, and each of the plurality of registration data contains a text content, a style identifier predefined for the style to be registered, a tone information of the tone to be registered, an audio information using the style to describe the text content, and a target acoustic feature information using the tone to be registered and the style to be registered to describe the text content.

Accordingly, the generation unit 1002*a* may be further used to generate a target style encoded feature, a predicted style encoded feature, and a predicted acoustic feature information by using the content encoder, the style encoder, the tone encoder, the style extractor, and the decoder in the speech synthesis model, based on the text content, the audio information using the style to describe the text content, the style identifier, and the tone information in each of the plurality of registration data. The construction unit 1002*b* may be further used to construct a comprehensive loss function based on the target style encoded feature, the predicted style encoded feature, the predicted acoustic feature information, and the target acoustic feature information. The adjustment unit 1002*c* may be further used to adjust parameters of the tone encoder, the style encoder, the style extractor, and the decoder in the speech synthesis model, so that the comprehensive loss function tends to converge.

Further optionally, the construction unit 1002*b* may be specifically used to: construct a style loss function based on the target style encoded feature and the predicted style encoded feature; construct a reconstruction loss function based on the predicted acoustic feature information and the target acoustic feature information; and construct a comprehensive loss function based on the style loss function and the reconstruction loss function.

The implementation principle and technical effect of the apparatus 1000 of registering the attribute in the speech synthesis model by using the modules described above in this embodiment are the same as those in the related method embodiments, which will not be repeated here.

According to the embodiments of the present disclosure, the present disclosure further provides an electronic device and a readable storage medium.

Figure 12:
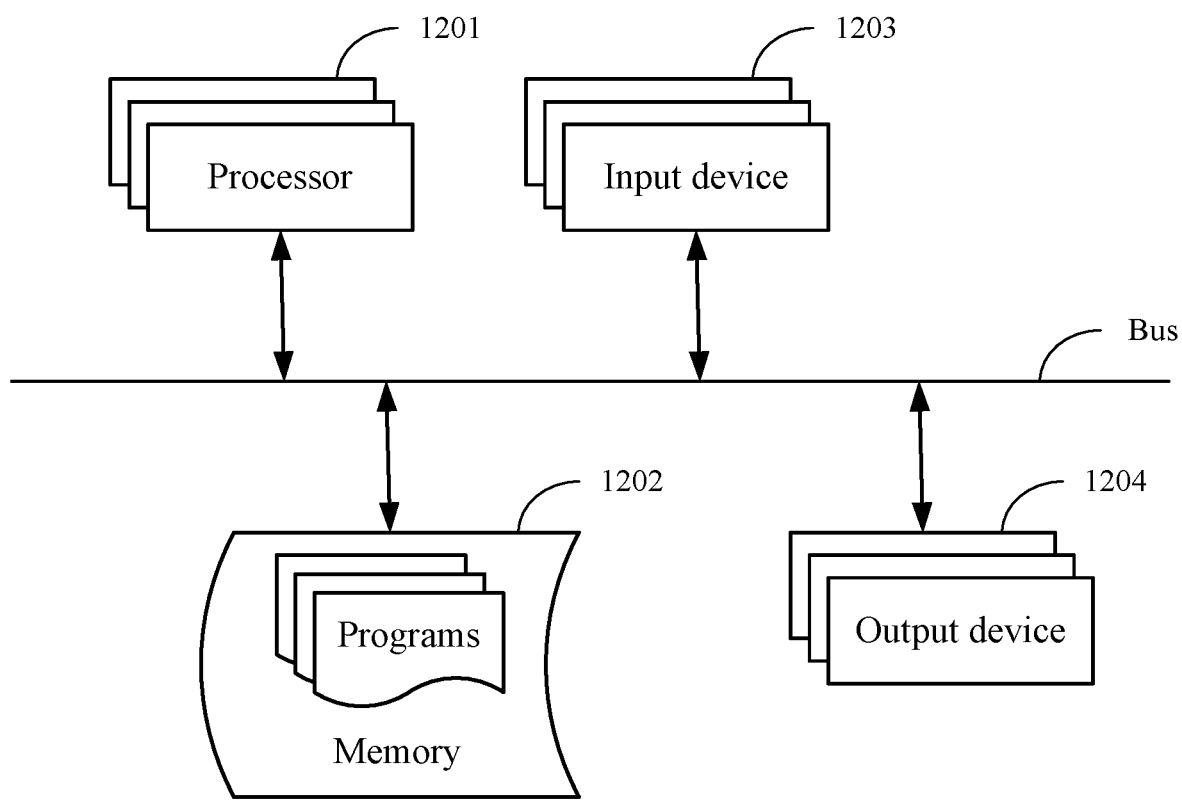
FIG. 12 shows a block diagram of an electronic device for implementing the method of registering the attribute in the speech synthesis model according to the embodiments of the present disclosure.

FIG. 12 shows a block diagram of an electronic device for implementing the method of registering the attribute in the speech synthesis module according to the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 12, the electronic device may include one or more processors 1201, a memory 1202, and interface(s) for connecting various components, including high-speed interface(s) and low-speed interface(s). The various components are connected to each other by using different buses, and may be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other embodiments, a plurality of processors and/or a plurality of buses may be used with a plurality of memories, if necessary. Similarly, a plurality of electronic devices may be connected in such a manner that each device providing a part of necessary operations (for example, as a server array, a group of blade servers, or a multi-processor system). In FIG. 12, a processor 1201 is illustrated by way of example.

The memory 1202 is a non-transitory computer-readable storage medium provided by the present disclosure. The memory stores instructions executable by at least one processor, to cause the at least one processor to perform the method of registering the attribute in the speech synthesis model provided in the present disclosure. The non-transitory computer-readable storage medium of the present disclosure stores computer instructions for allowing a computer to perform the method of registering the attribute in the speech synthesis model provided in the present disclosure.

The memory 1202, as a non-transitory computer-readable storage medium, may be used to store non-transitory software programs, non-transitory computer-executable programs and modules, such as program instructions/modules corresponding to the method of registering the attribute in the speech synthesis model in the embodiments of the present disclosure (for example, the relevant modules shown in FIG. 10 and FIG. 11). The processor 1201 executes various functional applications and data processing of the server by executing the non-transient software programs, instructions and modules stored in the memory 1202, thereby implementing the method of registering the attribute in the speech synthesis model in the embodiments of the method mentioned above.

The memory 1202 may include a program storage area and a data storage area. The program storage area may store an operating system and an application program required by at least one function. The data storage area may store data etc. generated by using the electronic device according to the method of registering the attribute in the speech synthesis model. In addition, the memory 1202 may include a high-speed random access memory, and may further include a non-transitory memory, such as at least one magnetic disk storage device, a flash memory device, or other non-transitory solid-state storage devices. In some embodiments, the memory 1202 may optionally include a memory provided remotely with respect to the processor 1201, and such remote memory may be connected through a network to the electronic device for implementing the method of registering the attribute in the speech synthesis model. Examples of the above-mentioned network include, but are not limited to the Internet, intranet, local area network, mobile communication network, and combination thereof.

The electronic device for implementing the method of registering the attribute in the speech synthesis model may further include an input device 1203 and an output device

1204. The processor 1201, the memory 1202, the input device 1203 and the output device 1204 may be connected by a bus or in other manners. In FIG. 12, the connection by a bus is illustrated by way of example.

The input device 1203 may receive input information of numbers or character, and generate key input signals related to user settings and function control of the electronic device for implementing the method of registering the attribute in the speech synthesis model, such as a touch screen, a keypad, a mouse, a track pad, a touchpad, a pointing stick, one or more mouse buttons, a trackball, a joystick, and so on. The output device 1204 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, an application specific integrated circuit (ASIC), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

These computing programs (also referred as programs, software, software applications, or codes) include machine instructions for a programmable processor, and may be implemented using high-level programming languages, object-oriented programming languages, and/or assembly/machine languages. As used herein, the terms "machine-readable medium" and "computer-readable medium" refer to any computer program product, apparatus and/or device (for example, magnetic disk, optical disk, memory, programmable logic device (PLD)) for providing machine instructions and/or data to a programmable processor, including a machine-readable medium for receiving machine instructions as machine-readable signals. The term "machine-readable signal" refers to any signal for providing machine instructions and/or data to a programmable processor.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), Internet, and a blockchain network.

The computer system may include a client and a server. The client and the server are generally far away from each other and usually interact through a communication network. The relationship between the client and the server is generated through computer programs running on the corresponding computers and having a client-server relationship with each other. The server may be a cloud server, also known as a cloud computing server or a cloud host, which is a host product in a cloud computing service system to solve defects of difficult management and weak business scalability existing in a traditional physical host and a VPS (Virtual Private Server) service.

According to the technical solution of the embodiments of the present disclosure, a plurality of registration data associated with an attribute to be registered is acquired, and the attribute is registered in the speech synthesis model by using the plurality of registration data associated with the attribute. The speech synthesis model is pre-trained by using a training data in a training data set. In this way, it is possible to register the attribute in the speech synthesis model, and enable the speech synthesis model to perform the speech synthesis based on the registered attribute, so as to meet personalized needs of users. Furthermore, the diversity and the interest of the speech synthesis of user scenarios may be enriched, the product closeness and personification may be improved, and the user experience may be improved. Moreover, the technical solution of the embodiments of the present disclosure may be applied to various personalized speech interaction scenarios, and may have a universal popularization.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the protection scope of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of registering an attribute in a speech synthesis model, comprising:
    acquiring a plurality of data associated with an attribute to be registered; and
    registering the attribute in the speech synthesis model by using the plurality of data associated with the attribute, wherein the speech synthesis model is trained in advance by using a training data in a training data set, wherein in response to the attribute containing a tone and a style, the acquiring a plurality of data associated with an attribute to be registered comprises:
    acquiring a plurality of registration data associated with a style to be registered and a tone to be registered, wherein each of the plurality of registration data contains a text content, a style identifier predefined for the style to be registered, a tone information of the tone to be registered, an audio information using the style to describe the text content, and a target acoustic feature information using the tone to be registered and the style to be registered to describe the text content,
wherein the registering the attribute in the speech synthesis model by using the plurality of data associated with the attribute comprises:
    generating a target style encoded feature, a predicted style encoded feature, and a predicted acoustic feature information by using a content encoder, a style encoder, a tone encoder, a style extractor, and a decoder in the speech synthesis model, based on the text content, the audio information using the style to describe the text content, the style identifier, and the tone information in each of the plurality of registration data; constructing a comprehensive loss function based on the target style encoded feature, the predicted style encoded feature, the predicted acoustic feature information, and the target acoustic feature information; and adjusting parameters of the tone encoder, the style encoder, the style extractor, and the decoder in the speech synthesis model, so that the comprehensive loss function tends to converge, and
wherein the constructing a comprehensive loss function based on the target style encoded feature, the predicted style encoded feature, the predicted acoustic feature information, and the target acoustic feature information comprises:
    constructing a style loss function based on the target style encoded feature and the predicted style encoded feature; constructing a reconstruction loss function based on the predicted acoustic feature information and the target acoustic feature information; and constructing the comprehensive loss function based on the style loss function and the reconstruction loss function.

2. The method according to claim 1, wherein in response to the attribute containing a tone, the acquiring a plurality of data associated with an attribute to be registered comprises:
    acquiring a plurality of registration data associated with a tone to be registered, wherein each of the plurality of registration data contains a text content, a tone information of the tone to be registered, an audio information of the text content, and a target acoustic feature information using the tone to be registered to describe the text content.

3. The method according to claim 2, wherein the registering the attribute in the speech synthesis model by using the plurality of data associated with the attribute comprises:
    generating a predicted acoustic feature information by using a content encoder, a style extractor, a tone encoder, and a decoder in the speech synthesis model, based on the text content, the audio information of the text content, and the tone information in each of the plurality of registration data;
    constructing a reconstruction loss function based on the predicted acoustic feature information and the target acoustic feature information; and
    adjusting parameters of the tone encoder and the decoder in the speech synthesis model, so that the reconstruction loss function tends to converge.

4. The method according to claim 1, wherein in response to the attribute containing a style, the acquiring a plurality of data associated with an attribute to be registered comprises:
    acquiring a plurality of registration data associated with a style to be registered, wherein each of the plurality of registration data contains a text content, a style identifier predefined for the style to be registered, and an audio information using the style to describe the text content.

5. The method according to claim 4, wherein the registering the attribute in the speech synthesis model by using the plurality of data associated with the attribute comprises:
    generating a target style encoded feature and a predicted style encoded feature by using a style extractor and a style encoder in the speech synthesis model, respectively, based on the text content, the style identifier, and the audio information using the style to describe the text content in each of the plurality of registration data;
    constructing a style loss function based on the target style encoded feature and the predicted style encoded feature; and
    adjusting parameters of the style extractor and the style encoder in the speech synthesis model, so that the style loss function tends to converge.

6. An electronic device, comprising:
at least one processor; and
a memory communicatively connected to the at least one processor, wherein the memory stores instructions executable by the at least one processor, and the instructions, when executed by the at least one processor, cause the at least one processor to implement operations of registering an attribute in a speech synthesis model, comprising:
    acquiring a plurality of data associated with an attribute to be registered; and
    registering the attribute in the speech synthesis model by using the plurality of data associated with the attribute, wherein the speech synthesis model is trained in advance by using a training data in a training data set,
wherein in response to the attribute containing a tone and a style, the acquiring a plurality of data associated with an attribute to be registered comprises:
    acquiring a plurality of registration data associated with a style to be registered and a tone to be registered, wherein each of the plurality of registration data contains a text content, a style identifier predefined for the style to be registered, a tone information of the tone to be registered, an audio information using the style to describe the text content, and a target acoustic feature information using the tone to be registered and the style to be registered to describe the text content,
wherein the registering the attribute in the speech synthesis model by using the plurality of data associated with the attribute comprises:
    generating a target style encoded feature, a predicted style encoded feature, and a predicted acoustic feature information by using a content encoder, a style encoder, a tone encoder, a style extractor, and a decoder in the speech synthesis model, based on the text content, the audio information using the style to describe the text content, the style identifier, and the tone information in each of the plurality of registration data; constructing a comprehensive loss function based on the target style encoded feature, the predicted style encoded feature, the predicted acoustic feature information, and the target acoustic feature information; and adjusting parameters of the tone encoder, the style encoder, the style extractor, and the decoder in the speech synthesis model, so that the comprehensive loss function tends to converge, and wherein the constructing a comprehensive loss function based on the target style encoded feature, the predicted style encoded feature, the predicted acoustic feature information, and the target acoustic feature information comprises:

constructing a style loss function based on the target style encoded feature and the predicted style encoded feature; constructing a reconstruction loss function based on the predicted acoustic feature information and the target acoustic feature information; and constructing the comprehensive loss function based on the style loss function and the reconstruction loss function.

7. A non-transitory computer-readable storage medium having computer instructions stored thereon, wherein the computer instructions allow a computer to implement operations of registering an attribute in a speech synthesis model, comprising:

acquiring a plurality of data associated with an attribute to be registered; and registering the attribute in the speech synthesis model by using the plurality of data associated with the attribute, wherein the speech synthesis model is trained in advance by using a training data in a training data set, wherein in response to the attribute containing a tone and a style, the acquiring a plurality of data associated with an attribute to be registered comprises:

acquiring a plurality of registration data associated with a style to be registered and a tone to be registered, wherein each of the plurality of registration data contains a text content, a style identifier predefined for the style to be registered, a tone information of the tone to be registered, an audio information using the style to describe the text content, and a target acoustic feature information using the tone to be registered and the style to be registered to describe the text content, wherein the registering the attribute in the speech synthesis model by using the plurality of data associated with the attribute comprises:

generating a target style encoded feature, a predicted style encoded feature, and a predicted acoustic feature information by using a content encoder, a style encoder, a tone encoder, a style extractor, and a decoder in the speech synthesis model, based on the text content, the audio information using the style to describe the text content, the style identifier, and the tone information in each of the plurality of registration data; constructing a comprehensive loss function based on the target style encoded feature, the predicted style encoded feature, the predicted acoustic feature information, and the target acoustic feature information; and adjusting parameters of the tone encoder, the style encoder, the style extractor, and the decoder in the speech synthesis model, so that the comprehensive loss function tends to converge, and wherein the constructing a comprehensive loss function based on the target style encoded feature, the predicted style encoded feature, the predicted acoustic feature information, and the target acoustic feature information comprises:

constructing a style loss function based on the target style encoded feature and the predicted style encoded feature; constructing a reconstruction loss function based on the predicted acoustic feature information and the target acoustic feature information; and constructing the comprehensive loss function based on the style loss function and the reconstruction loss function.

\* \* \* \* \*